(12) United States Patent
Albrecht et al.

(10) Patent No.: US 9,016,453 B2
(45) Date of Patent: Apr. 28, 2015

(54) CONNECTING DEVICE FOR TWO SHAFTS HAVING A REBOUND CUSHION

(71) Applicant: ZF Friedrichshafen AG, Friedrichshafen (DE)

(72) Inventors: Stefan Albrecht, Leutkirch (DE); David Elsdoerfer, Kelkheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 138 days.

(21) Appl. No.: 13/912,436

(22) Filed: Jun. 7, 2013

(65) Prior Publication Data
US 2013/0334001 A1    Dec. 19, 2013

(30) Foreign Application Priority Data

Jun. 19, 2012 (DE) .......................... 10 2012 210 298

(51) Int. Cl.
| F16D 11/04 | (2006.01) |
| F16D 11/14 | (2006.01) |
| F16D 11/00 | (2006.01) |
| F16D 23/12 | (2006.01) |

(52) U.S. Cl.
CPC ............. F16D 11/14 (2013.01); F16D 11/04 (2013.01); *F16D 2011/002* (2013.01); *F16D 2011/006* (2013.01); *F16D 2023/123* (2013.01)

(58) Field of Classification Search
CPC .............. F16D 11/04; F16D 2011/002; F16D 2066/008; F16D 2300/22
USPC ....... 192/69.4–69.43, 69.9, 109 R, 30 W, 149
See application file for complete search history.

(56) References Cited

U.S. PATENT DOCUMENTS

| 4,244,455 | A | * | 1/1981 | Loker ............................. 192/24 |
| 4,739,673 | A | * | 4/1988 | Ishikawa et al. ................ 74/493 |
| 4,828,094 | A | * | 5/1989 | Torii et al. ..................... 192/139 |
| 5,170,870 | A | | 12/1992 | Kampf |

(Continued)

FOREIGN PATENT DOCUMENTS

| DE | 37 02 778 A1 | 8/1988 |
| DE | 40 26 211 C1 | 1/1992 |

(Continued)

OTHER PUBLICATIONS

German Search Report Corresponding to 10 2012 210 298.1 mailed Aug. 8, 2012.

*Primary Examiner* — Richard Lorence
(74) *Attorney, Agent, or Firm* — Davis & Bujold, P.L.L.C.; Michael J. Bujold

(57) ABSTRACT

A connecting device (1) for the rotationally fixed connection of first and second shafts (2, 3) that can rotate relative to one another. The connecting device (1) comprises an axially movable connecting element (5) designed such that, in a first axial position (A), the connecting element (5) forms an interlock between the first and second shafts (2, 3) and, in a second axial position (B), the connecting element (5) releases the interlock. The connecting device (1) also comprises an actuating system (6, 8, 9, 10, 11) for moving the connecting element between the first and second axial positions (A, B) and a stop (16) which limits the axial movement of the connecting element (5) in the first or second axial position (A, B). An impact damper (17) is provided for the stop (16) in order to reduce annoying noise when the connecting element (5) strikes against the stop (16).

10 Claims, 3 Drawing Sheets

(56) References Cited

U.S. PATENT DOCUMENTS

| | | | |
|---|---|---|---|
| 6,170,628 B1 | 1/2001 | Bigley | |
| 8,205,733 B2* | 6/2012 | Schumacher | 192/69.41 |
| 2006/0124427 A1* | 6/2006 | McCalla et al. | 192/69.41 |
| 2009/0078525 A1* | 3/2009 | Schumacher et al. | 192/69.41 |
| 2010/0089685 A1 | 4/2010 | Quehenberger et al. | |
| 2012/0037472 A1 | 2/2012 | Rosemeier et al. | |
| 2013/0112522 A1 | 5/2013 | Granzow et al. | |

FOREIGN PATENT DOCUMENTS

| | | |
|---|---|---|
| DE | 198 37 417 A1 | 4/1999 |
| DE | 102 24 357 A1 | 12/2003 |
| DE | 103 33 948 A1 | 2/2005 |
| DE | 10 2009 049 013 A1 | 4/2010 |
| DE | 10 2009 002 661 A1 | 10/2010 |
| DE | 10 2011 085 839 A1 | 5/2013 |

* cited by examiner

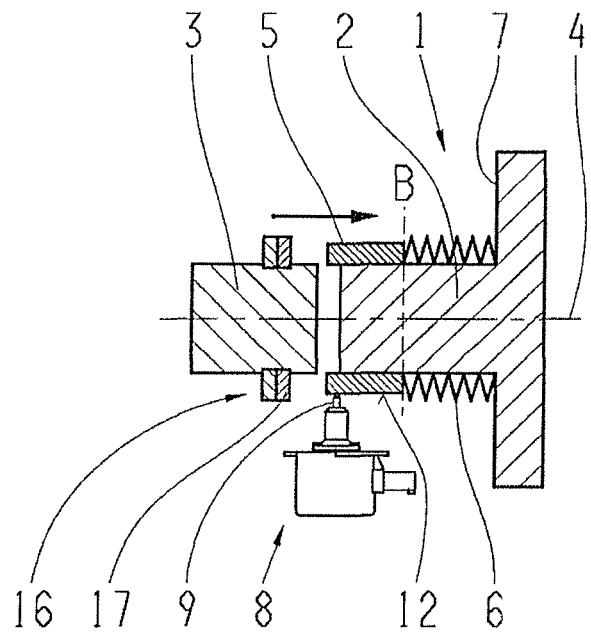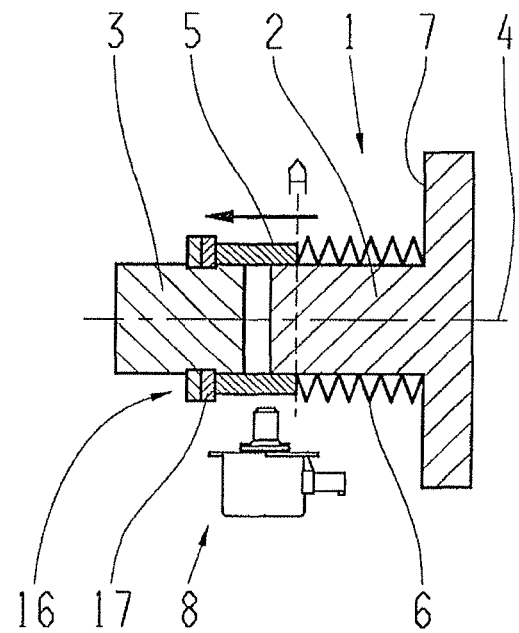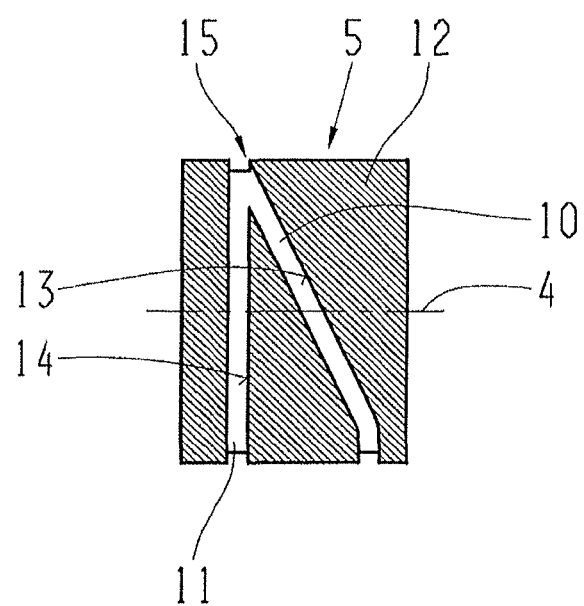

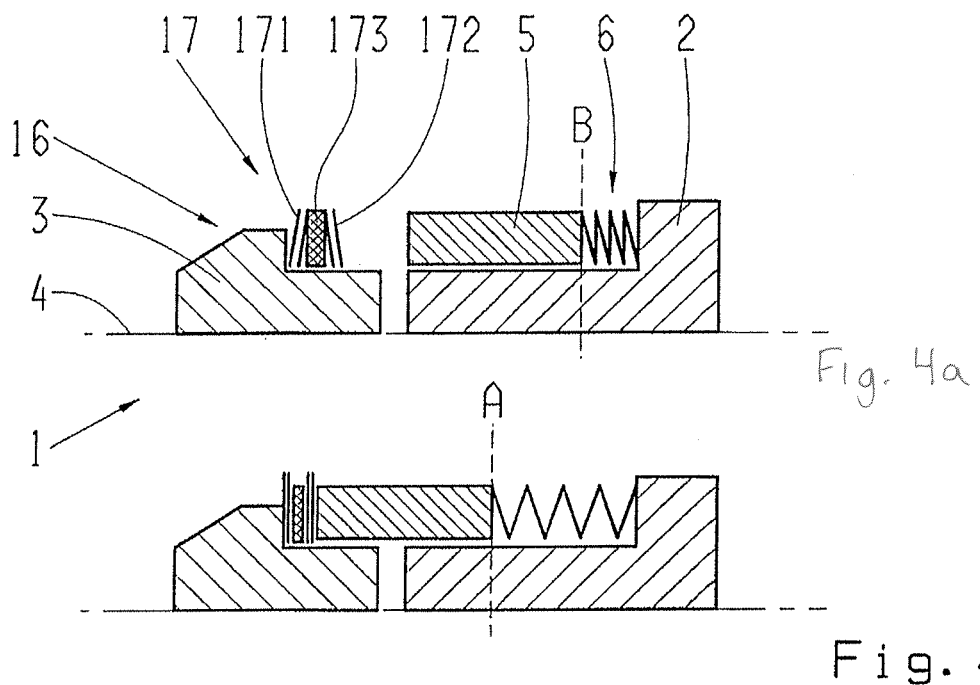
Fig. 4a
Fig. 4
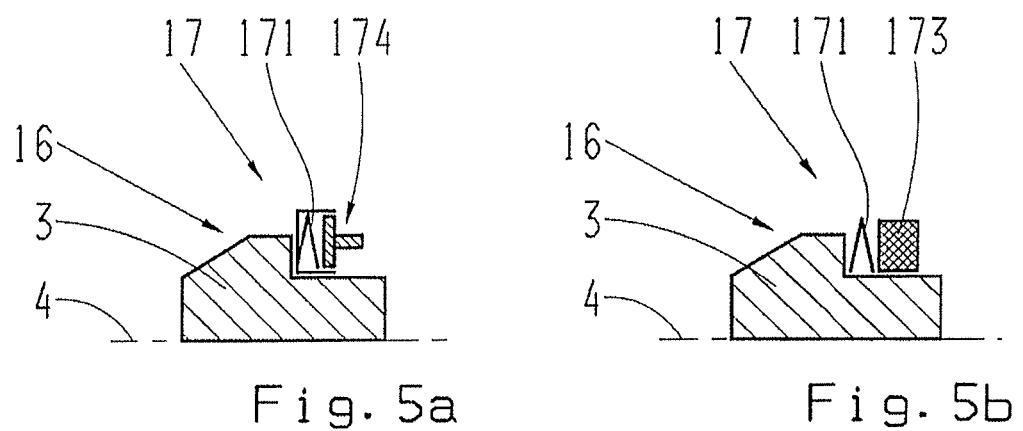
Fig. 5a
Fig. 5b
Fig. 5c
Fig. 5d

CONNECTING DEVICE FOR TWO SHAFTS HAVING A REBOUND CUSHION

This application claims priority from German patent application serial no. 10 2012 210 298.1 filed Jun. 19, 2012.

FIELD OF THE INVENTION

The invention relates to a connecting device.

BACKGROUND OF THE INVENTION

In a vehicle drive-train such a connecting device serves in particular for engaging an all-wheel shaft or wheel driveshaft, also called an axle driveshaft or side-shaft, or for connecting the two halves of an all-wheel shaft or wheel driveshaft. For example, in a vehicle drive-train having a number of drivable drive axles, it makes it possible to switch over between an all-wheel operating mode, in which more than one or indeed all the drive axles of the vehicle drive-train are driven, and a two-wheel operating mode in which fewer or indeed only one of the drive axles of the vehicle drive-train are driven, and conversely.

For example, DE 198 37 417 A1 (FIG. 2) discloses such a connecting device of a vehicle drive-train for the rotationally fixed connection of two shafts, i.e. an automatic clutch for connecting a front axle to a wheel spindle. The connecting device comprises an electromagnet by which a clutch ring can be moved axially to a first position in which the clutch ring releases an interlock between the shafts, and also comprises a spring by which the clutch ring can be moved axially to a second position in which the clutch ring produces an interlock between the shafts.

The previously unpublished document DE 10 2011 085 839 discloses another connecting device for connecting two shafts. This connecting device comprises on the one hand a sliding sleeve with a groove or step flank arranged on it, and an adjusting means that can be engaged in a switchable manner in the groove/step flank. This displaces the sliding sleeve to a first position when the adjusting means engage in the groove or step flank and the sliding sleeve is rotated, whereby the sliding sleeve releases an interlock between the shafts. On the other hand the connecting device comprises a spring by which, when the adjusting means are disengaged from the groove/step flank, the sliding sleeve can be moved to a second position in which the sliding sleeve produces an interlock between the shafts.

Inasmuch as the shift positions of the clutch ring or the sliding sleeve are defined by a mechanical stop, the impact of the clutch ring or sliding sleeve against the stop can be hard when it is moved to the corresponding shift position. This can lead to disturbing knocking noises.

SUMMARY OF THE INVENTION

Accordingly, the purpose of the present invention is to reduce the noise emitted by such a connection device.

This objective is achieved by providing an impact damper for a stop of the connecting device which limits an axial movement of a connecting element to a first or a second axial position.

Thus, the invention relates to a connecting device, in particular for a vehicle drive-train, for the rotationally fixed connection of a first and a second shaft that can rotate relative to one another, such that the connecting device comprises an axially movable connecting element designed so that in a first axial position it produces an interlock between the first and the second shaft whereas in a second axial position it releases the interlock. The connecting element can in particular be a sliding sleeve arranged in a ring shape around one or both of the shafts, in particular coaxially with the shafts. Preferably, the connecting element is designed in the manner of the sliding sleeve described in DE 10 2011 085 839. In this connection axially movable means in particular movable linearly or transversely, i.e. at least along a line. The line is in particular a rotational axis of the two shafts.

In addition the connecting device according to the invention comprises an actuating system for moving the connecting element between the first and the second axial positions. This can be, in particular, the actuating system disclosed in DE 10 2011 085 839.

Moreover, the connecting device has a stop which limits the axial movement of the connecting element in at least one of the first or the second axial positions. In this case an impact damper is provided for the stop. In particular, this can be on the stop itself or on the connecting element.

In this way, depending on which stop the impact damper is arranged on, the noise emission of the connecting device when the connecting element is moved to one of the first and/or second axial positions can be substantially reduced. Thus, the impact damper is in particular designed such that it absorbs part of the kinetic energy of the connecting element when it moves axially to the first or second axial position, in particular with a damping effect.

The actuating system can in particular comprise a spring arrangement which moves the connecting element to one of the first or the second axial positions. Furthermore the actuating system can comprise an electromagnetic actuator, i.e. an electromagnet, which by means of an armature moves the connecting element to the other of the first or second axial positions, or even to both axial positions if the armature is made with permanent magnetic means.

The actuating system can preferably also comprise a shifting cam, in particular in the form of a groove or step flank, on or in the connecting element, and shifting means that can be shiftably engaged in the shifting cam in order to move the connecting element to the second axial position when it is rotated, in accordance with FIGS. 1 to 3 or FIGS. 4 to 9 of DE 10 2011 085 839. In this case a spring arrangement is then provided, which moves the connecting element back to the first axial position as soon as the engagement means are disengaged from the shifting cam. The actuating system so provided requires particularly little energy.

In a particularly preferred further development the impact damper comprises at least both a spring element and also a damper element. This results in particularly good noise damping. The at least one spring element results in a smooth uptake of impact energy while the at least one damper element converts at least part of the impact energy into heat energy. Consequently, suitable damper elements absorb mechanical impacts and convert them at least partially to heat. Thus suitable damper elements consist in particular of elastomers such as caoutchouc or rubber etc., or in particular foams or foamed materials such as plastic or metallic foams etc., or in particular fiber elements such as glass-fiber or carbon-fiber reinforced plastic disks with a synthetic resin matrix etc., or fluid-filled cushions such as cushions filled with air, oil or a gel. Suitable spring elements absorb mechanical impacts and cushion them, in particular by the elastic build-up of potential energy. Thus, suitable spring elements consist in particular of one or more spiral springs, cup springs, corrugated springs, etc.

In a further development of this, the spring element and the damper element are arranged in series with one another. This results in a narrower fitting space which, for example, cannot be achieved with a parallel arrangement of the spring and damper elements. For this, after loading and unloading (load cycle; shifting process of the connecting device) the spring element should revert to its original shape in order to be ready again for further load cycles, i.e. complete shifting processes of the connecting device.

In a further development, the actuating system comprises a spring arrangement which brings about an axial movement of the connecting element to one of the two axial positions. In this case the stop and the impact damper are arranged so that they limit the axial movement of the connecting element in the one of the two axial positions. In particular the spring arrangement moves the connecting element to the axial position, in that it is first stressed and, on relaxing, moves the connecting element to that axial position. In this way a hard impact of the connecting element against the stop caused by the spring is softened or prevented.

In a further development the stop and the impact damper are arranged on one of the shafts. In this case the impact damper surrounds the shaft in a ring shape. The connecting element is also arranged on one of the two shafts and surrounds that shaft in a ring shape. Consequently the connecting element is designed in the manner of a sliding sleeve arranged to move axially on the first or second shaft. Shaped to match the connecting element, the impact damper is also designed to fit around one of the shafts and is arranged on it. This produces a connecting device of structurally simple form which occupies little fitting space.

In a further development, the connecting element is arranged rotationally fixed but axially movably on one of the shafts and has at least one and preferably a plurality of interlock elements. In the first axial position of the connecting element this or these come into engagement with at least one and preferably a plurality of corresponding interlock elements of the second shaft, so that they produce the interlock between the two shafts. This too produces a structurally simple connecting device which takes up little space. The interlock elements can in particular be mutually corresponding splined shaft profiles, polygonal profiles, claws, teeth, pins etc.

In a further development the actuating system comprises a shifting cam arranged on the connecting element. This is shaped such that when at least one engagement means (for example a shifting pin, friction block, roller etc.) of the actuating system engages on/in the shifting cam and at the same time the connecting element is rotated relative to the engagement means, the connecting element moves to one of the two axial positions. In particular the shifting cam has a contour which at least in part comprises an axial direction component. Thus a connecting device is provided, which is actuated in the manner of the connecting device disclosed in DE 10 2011 085 839. It is characterized by low energy expenditure for its actuation.

In a further development thereof the shifting cam of the actuating system is designed such that when the engagement means engages on/in the shifting cam and at the same time the connecting element is rotated relative to the engagement means, the connecting element is moved axially to the second axial position. In this case a spring arrangement of the actuating system is designed such that when the engagement of the engagement means in the shifting cam is released, the connecting element is moved axially back to the first axial position. In this way too a connecting device is provided, which is actuated like the connecting device disclosed in DE 10 2011 085 839 and which requires correspondingly little energy for its actuation.

In another further development, the connecting element comprises a cone directed in the axial movement direction of the connecting element, or is of conical shape in at least one section. In this case the cone co-operates with a distance sensor directed substantially perpendicularly to the movement direction in such manner that by means of it, a distance between the distance sensor and the cone perpendicular to the movement direction can be determined. In this way, by virtue of the determined distance between the distance sensor and the cone an exact axial position of the connecting element can be determined in a simple and continuous manner. Correspondingly, an evaluation circuit is preferably additionally provided, by means of which, from the distance between the distance sensor and the cone, an axial position of the connecting element can be determined. The position can in particular be the first or the second axial position. Thus, it can also be simply determined whether the connecting device is coupling or has decoupled the first and the second shaft, i.e. the precise condition of the connecting device can be determined.

BRIEF DESCRIPTION OF THE DRAWINGS

Below, the invention is explained in more detail with reference to examples and drawings, from which further advantageous design features and characteristics of the invention emerge. The drawings show, in each case represented schematically:

FIGS. 1, 2: An example embodiment of a connecting device for two shafts which can be coupled to one another in a rotationally fixed manner by means of an axially displaceable connecting element, shown respectively in the decoupled condition and in the coupled condition, FIG. 3: A view from above of the outer circumferential surface, provided with two steps, of the connecting element of the connecting device according to FIGS. 1 and 2, FIG. 4, 4*a*: A further development of the example embodiment in FIGS. 1, 2 and 3, FIGS. 5*a-d*: Example embodiments of suitable impact dampers.

DETAILED DESCRIPTION OF THE PREFERRED EMBODIMENTS

Figure 6:
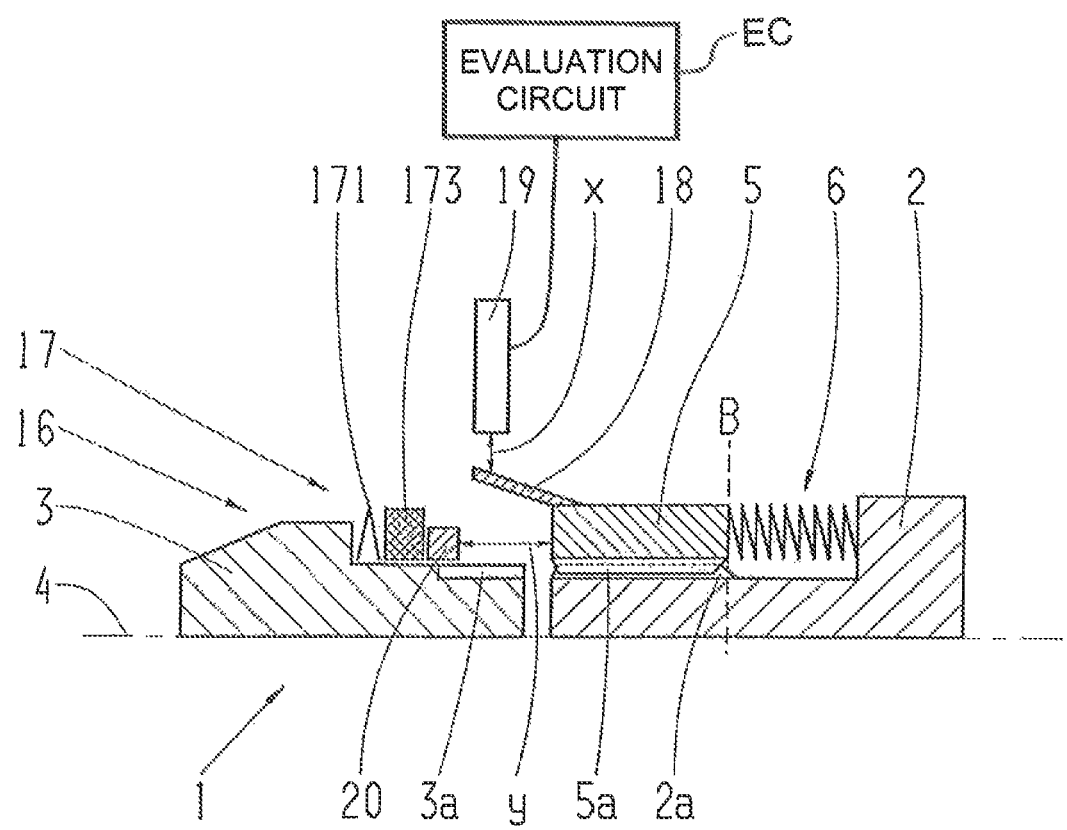
FIG. 6: Another further development of the connecting device.

In FIGS. 1 to 6 components that correspond to one another are given the same indexes. Also, details of the example embodiments explained below can constitute an invention in their own right or can form part of the object of an invention.

FIGS. 1 and 2 show longitudinally sectioned representations of an example embodiment of a connecting device 1 with a first coupling component, i.e. a first shaft 2, and a second coupling component, i.e. a second shaft 3. The connecting device 1 can be in particular a claw clutch. The two shafts 2 and 3 are each mounted to rotate about a common rotational axis 4. They can be coupled to one another with interlock by means of a connecting element 5, in this case a sliding sleeve, which can be displaced back and forth axially, i.e. along the direction of the rotational axis 4. The connecting element 5 is arranged in a ring around and coaxially with the shafts 2, 3, i.e. the rotational axis 4 of the shafts 2, 3 at the same time forms the rotational axis of the connecting element 5. This gives a very much more compact structure of the connecting device 1.

The connecting element 5 is designed essentially as a hollow cylindrical component, on the inside circumferential surface of which (not shown in FIGS. 1 and 2 in order to simplify the representation) interlock elements are provided, which in particular form a ring of inner teeth which interact with interlock elements (also not shown in FIGS. 1 and 2) that correspond with them and form a ring of outer teeth on the two shafts 2 and 3. Suitable other interlock elements are for example polygonal shaft profiles, claws, pins, etc. The interlock elements of the connecting element 5 engage in the corresponding interlock elements of the two shafts 2 and 3, so as to produce an interlocked, rotationally fixed connection between the connecting element 5 and the first or second shaft 2, 3. However, at least in relation to the second shaft 3 the connection is releasable.

What is not shown, is that between the connecting element 5 and the second shaft 3 synchronizing means, for example one or more synchronization rings, can also preferably be arranged. When the shafts 2, 3 are being coupled these at first produce rotational speed equalizing frictional contact between the second shaft 3 and the connecting element 5 before the interlocked connection between these, and therefore between the shafts 2, 3, is formed.

In the decoupled condition shown in FIG. 1 the connecting element 5 is only in contact with the first coupling component 2. It is here in its second axial position B and there is no contact with the second shaft 3. Here, the connecting element 5 is in its decoupling position. In contrast, in the coupled condition shown in FIG. 2, the connecting element 5 is in contact with both shafts 2 and 3, which results in a rotationally fixed coupling of the two shafts 2 and 3. In that situation the connecting element 5 is in its first axial position A, which corresponds to its coupling position.

The sliding sleeve 5 is supported by means of a spring arrangement 6 against a projection 7 provided on the first shaft 2. In the decoupled condition shown in FIG. 1 the spring arrangement 6 is pre-stressed. The spring force tries to push the connecting element 5 axially in the direction toward the second shaft 3, i.e. the spring force of the spring arrangement 6 acts on the connecting element 5 in the direction of the second shaft 3. Thus, the spring arrangement 6 forms part of an actuating system for moving the connecting element 5 axially.

The axial movement or displacement of the connecting element 5 to its second axial position B (condition shown in FIG. 1) takes place by virtue of a control element 8 which, in the example embodiment, is in the form of an electromagnetically actuated actuator with a shifting pin 9 that can be displaced in the radial direction relative to the sliding sleeve in the sense of an engagement means. Thus, the control element 8 forms a further part of the actuating system for moving the connecting element 5 axially. This shifting pin 9 can be moved in and out between the extended control element decoupling position shown in FIG. 1 and the retracted control element coupling position shown in FIG. 2. Other ways of actuating the shifting pin 9 are possible, in particular spring-induced, electric motor driven, hydraulic or pneumatic actuation means, i.e. displacement of the shifting pin to its retracted and/or extended condition.

The control element 8 is preferably arranged in a fixed position on or in a housing (not shown here) within which the shafts 2, 3 are arranged so that they can rotate relative to one another about the rotational axis 4. The housing can in particular be a transmission housing. Thus, the connecting element 5 and the shafts 2, 3 can rotate relative to the housing and the control element 8/shifting pin 9.

In its control element decoupling position the shifting pin 9 engages in a shifting cam arranged on the connecting element 5, which is provided on an outer circumferential surface 12 of the connecting element 5. The outer circumferential surface 12 with the shifting cam is shown in FIG. 3 as viewed from above and in this example is designed as a first and a second groove 10, 11, although other design forms of the shifting cam are also possible. For example, instead of the grooves 10, 11 in particular step flanks can be used, as illustrated in FIGS. 4 to 10 of DE 2011 085 839. Alternatively, instead of the grooves 10, 11 correspondingly designed extrusions can be used.

As shown in FIG. 3, respective groove sidewalls of the grooves 10 and 11 form a first step with a first step flank 13 and a second step with a second step flank 14. In its control element decoupling position the shifting pin 9 is first in contact against the first step flank 13 and then, in the fully decoupled condition shown in FIG. 1, against the second step flank 14. The first step flank 13 has a step path with an axial direction component and a direction component in the circumferential direction, while in contrast the second step flank 14 has essentially only a direction component in the circumferential direction. At a point of intersection 15 the first step flank 13 changes to the second step flank 14.

When the connecting device 1 is in its coupled condition (see FIG. 2), the shifting pin 9 is in its retracted control element decoupling position. In this case the effect of the spring arrangement 6 is to hold the connecting element 5 firmly in its first axial position A. The two shafts 2 and 3 are then coupled by means of the connecting element 5 and rotate together with it about the rotational axis 4 (and thus relative to the control element 8/shifting pin 9). To change the connecting device 1 to its decoupled condition (see FIG. 1), the shifting pin 9 is moved to its extended control element decoupling position, wherein it first engages in the first groove 10 and is in contact against the first step flank 13. By virtue of the rotation movement of the two shafts 2 and 3 and of the connecting element 5 fitted in a rotationally fixed manner onto them relative to the control element 8 the shifting pin 9 moves (considered relatively) in the first groove 10 along the first step flank 13 to the intersection point 15, whereby owing to the screw action or axial direction component of the connecting element 5 is pushed axially in opposition to the force of the spring arrangement 6 and drawn clear of the second shaft 3. During this the spring arrangement 6 is stressed, i.e. it builds up elastic potential energy. As soon as the shifting pin 9 reaches the intersection point 15 the decoupling process ends. The connecting element 5 has adopted its second axial position B. The two shafts 2 and 3 are then no longer mechanically coupled to one another in a rotationally fixed manner. The shifting pin 9 remains in its extended control element decoupling position and is then in the second groove 11 in contact against the second step flank 14. If the first shaft 2 is not a driven shaft the rotation movement of the first shaft 2 ceases. There is then also no longer any sliding friction between the shifting pin 9 and the second step flank 14.

To change the connecting device 1 back again to the coupled condition, the first shaft 2 and with it the connecting element 5 is preferably rotated by a drive unit (not shown in FIGS. 1 and 2). When the rotational speed of the first shaft 2 is preferably substantially the same as the rotational movement of the second shaft 3, the shifting pin 9 is moved back to its retracted control element coupling position. The pre-stressed spring arrangement 6 then pushes the connecting element 5 axially over the second shaft 3 and to its first axial position A, whereby the mechanically interlocked coupling of the two shafts 2, 3 is formed again.

In order to limit the movement range of the connecting element 5 in, or in the direction of the first axial position A, a mechanical stop 16 is arranged fixed on the second shaft 3. This prevents overshooting of the connecting element 5 beyond the first axial position A. Since when the two shafts 2, 3 are coupled the connecting element 5 can impact unrestrictedly against the stop 16, which would cause knocking noises, an impact damper 17 is provided on the second shaft 3 on the stop 16, which absorbs at least part of the impact energy and substantially reduces the associated noise. The impact damper is in the form of a ring that surrounds the second shaft 3. As can be seen in FIGS. 1 and 2 the impact damper 17 is positioned axially between the stop 16 and the connecting element 5. Basically it can also be arranged on the connecting element 5 and will then only co-operate with the stop 16 when the connecting element 5 moves to the first position A.

As the impact damper 17, in particular a rubber element, a foam element or the like can be used. Preferably a combination of different damper elements and spring elements, if necessary also made of different respective materials is used, in order to adapt the damping properties of the impact damper 17 selectively to the conditions of use prevailing in each case, such as temperature of use, environment of use (oil, dirt), spring force of the spring arrangement 6, etc.

FIGS. 4, 4a show a further development of the example embodiment in FIGS. 1 to 3. For simplicity the control element 8 and its associated shifting ping 9 have been omitted. In contrast to FIGS. 1 and 2, in the embodiment according to FIGS. 4, 4a the stop 16 is made as part of the shaft 3. Furthermore, the impact damper 17 consists of first spring elements 171, namely two cup springs, and second spring elements 172, namely two more cup springs, as well as a damper element 173 arranged between the first and second spring elements 171, 172, the damper element for example consisting of rubber or an elastomer, foam material or the like. In particular the damper element 173 can be made hollow or solid. For example, the damper element can simply consist of a rubber O-ring. The spring elements 171, 172 are arranged in series with the damper element 173. In this case that means that they are arranged on the shaft 3 axially one after another. In FIG. 4a the connecting element 5 is in its second axial position B in which the shafts 2, 3 are decoupled from one another, and in FIG. 4 the connecting element 5 is in its first axial position A in which the shafts 2, 3 are coupled to one another and in which the impact damper 17 or its components 171, 172, 173 are compressed by the spring force of the spring arrangement 6.

FIGS. 5a to 5d show further example embodiments of the impact damper 17, which can be used with the connecting devices 1 according to FIGS. 1 to 4a. The first shaft 2, the connecting element 5, the spring arrangement 6 and the control element 8 are not shown here.

In FIG. 5a the impact damper 17 consists of a piston-cylinder unit 174 and a spring element 171 arranged therein. The piston-cylinder unit 174 is designed such that a piston is pushed into the cylinder when the connecting element (not shown) is moved to its first axial position. Thereby, a fluid such as air and/or oil present inside the piston-cylinder unit 174 is expressed out of it, producing a damping effect. In this case the fluid can for example also pass between two spaces of the unit 174 separated from one another by constrictions. The spring element 171 serves to restore the piston-cylinder unit 174 to the initial position when the connecting element moves from the first to the second position. In addition the spring element 171 serves to cushion the connecting element when it moves to the first axial position in the direction toward the stop 16.

In FIG. 5b the impact damper 17 has only one spring element 171 and a solid and essentially rectangular damper element 173. The damper element 173 has a rectangular cross-section (cross-section in the circumferential direction).

As can be seen from the example embodiment shown in FIG. 5c, however, the cross-section (in the circumferential direction) can also be designed otherwise. In FIG. 5c it is X-shaped or shaped like a plus sign. Other suitable cross-section shapes are for example a star-shape, a U-shape or a V-shape.

According to FIG. 5d, the damper element can also be in the form of a closed cushion 175, which is filled with a suitable damping fluid such as a gel or an oil. In this case a spring element 171 is arranged in the cushion, which restores the cushion 175 to its initial shape as illustrated when the connecting element is in or moves to the second axial position. Furthermore the spring element 171 serves to cushion the connecting element during its movement to the first axial position. In this case the spring element 171 can even be omitted provided that the shell of the cushion 175 alone produces a restoring force sufficient to enable this restoration of shape.

FIG. 6 shows a further embodiment of the connecting device 1 of FIGS. 1 to 4, wherein the impact damper 17 is made like that shown in FIG. 5b. For simplicity the control element 8 and its associated shifting pin 9 have not been shown. However, the figure shows interlock elements 2a, 3a, 5a in the form of spline profiles of the shafts 2, 3 and the connecting element 5, respectively, that correspond with one another so that an interlock can be formed between the first and second shafts 2, 3. So that the impact damper 17 is not radially in contact with the interlock 3a, which could result in rapid wear of the impact damper 17, the damper is separated by an axial distance from them. A sleeve 20 extends the connecting element 5 axially toward the stop 16 so that when it moves to its first axial position it is braked by the impact damper 17 despite the axial separation. Alternatively, the sleeve 20 can also be made integrally with the connecting element 5.

In the embodiment shown in FIG. 6 the connecting element 5 has a cone 18. The cone 18 is orientated in the direction of the connecting element's axial movement (i.e. it is not directed transversely to the movement direction). The axial movement direction is parallel to the rotational axis 4. A distance sensor 19 is directed essentially perpendicularly to the movement direction or rotational axis 4. By means of the distance sensor 19, a radial distance x between the cone 18 and the distance sensor 19, i.e. a distance perpendicular to the movement direction/rotational axis 4, can be determined. The distance x varies continuously depending on the axial position of the connecting element 5. Thus, by virtue of the distance x the axial (current) position of the connecting element 5 can be determined. For example, the distance y between the connecting element and the stop 16 or the impact damper 17 can therefore be determined in a simple manner.

As diagrammatically shown in FIG. 6, an evaluation circuit EC can be provided, by means of which the respective axial position of the connecting element 5 can be determined from the distance x.

Where appropriate, in the example embodiments according to FIGS. 1 to 6 other spring elements 171 can also be used, for example one or more cup springs, corrugated springs or spiral springs. Particularly in the embodiments shown in FIGS. 4, 4a, 5b, 5c and 6, if appropriate the positions of the spring elements 171 and the damper elements 173 can be exchanged. Basically, a plurality of damper elements 173 and spring elements 171 can also be provided in a suitable axial sequence, even ones of different structures and/or made from different materials. In particular the damper elements 173 can also be arranged fixed on or to the connecting element 5. Needless to say, a fixed arrangement on the stop 16 is likewise conceivable.

Compared with the known connecting devices the connecting device according to the invention enables very low-noise actuation, since impact noises of the connecting element against the stop are greatly reduced.

INDEXES

1 Connecting device
1 Shaft
2a Interlock element of the shaft 2
3 Shaft
3a Interlock element of the shaft 3
4 Rotational axis
5 Connecting element
5a Interlock element of the connecting element 5
6 Spring arrangement
7 Projection
8 Control means
9 Shifting pin/engagement means
10 Groove
11 Groove
12 Outer circumferential surface
13 First step flank
14 Second step flank
15 Intersection point
16 Stop
17 Impact damper
171 Spring element
172 Spring element
173 Damper element
174 Piston-cylinder unit
175 Cushion
18 Cone
19 Distance sensor
20 Sleeve
A First axial position of the connecting element 5
B Second axial position of the connecting element 5
x Distance
y Distance

The invention claimed is:

1. A connecting device (1) for a rotationally fixed connection of first and second shafts (2, 3) that are rotatable with respect to one another, wherein the connecting device (1) comprises:
 an axially movable connecting element (5) designed such that, in a first axial position (A) thereof, the connecting element forms an interlock between the first and the second shafts (2, 3), and
 in a second axial position (B), the connecting element releases the interlock,
 an actuating system (6, 8, 9, 10, 11) for moving the connecting element between the first and the second axial positions (A, B),
 a stop (16) for limiting axial movement of the connecting element (5) in either the first or the second axial position (A, B),
 an impact damper (17) is arranged axially between the stop (16) and the connecting element (5), and
 the impact damper (17) comprises a spring element and a damper element (171, 172, 173, 174, 175).

2. The connecting device (1) according to claim 1, wherein the spring element (171, 172) and the damper element (173, 174, 175) are arranged in series with one another.

3. The connecting device (1) according to claim 1, wherein the actuating system (6, 8, 9) comprises a spring arrangement (6) which brings about axial movement of the connecting element (5) to one of the first and the second axial positions (A, B),
 potential energy, stored when the spring arrangement (6) is stressed, moves the connecting element (5) to the one of the first and the second axial positions (A, B) when the spring arrangement (6) is relieved, and
 the stop (16), with the impact damper (17), are arranged so as to limit the movement of the connecting element (5) in the one of the first and the second axial positions (A, B).

4. The connecting device (1) according to claim 3, wherein the actuating system (6, 8, 9, 10, 11) comprises a shifting cam (10, 11) arranged on the connecting element (5), the shifting cam (10, 11) is designed so that when an engagement element (9) of the actuating system (6, 8, 9) engages either on or in the shifting cam (10, 11) and, at the same time, the connecting element (5) is rotated relative to the engagement element (9), the connecting element (5) is moved axially to the second axial position (B), and the spring arrangement (6) is designed so that when the engagement element (9) is disengaged from the shifting cam (10, 11), the spring arrangement (6) moves the connecting element (5) to the first axial position (A).

5. The connecting device (1) according to claim 1, wherein the stop (16) and the impact damper (17) are arranged on one of the first and the second shafts (2, 3) and the impact damper (17) is ring shaped and surrounds the one of the first and the second shafts (2, 3), and the connecting element (5) is also arranged on one of the first and the second shafts (2, 3) and is ring shaped and surrounds the one of the first and the second shafts (2, 3).

6. The connecting device (1) according to claim 1, wherein the connecting element (5) is arranged in a rotationally fixed manner and axially movable on one of the first and the second shafts (2, 3), and the connecting element (5) comprises at least one interlock element (5a) which, in the first axial position (A), engages with at least one interlock element (3a) of the second shaft (3) that corresponds therewith and thereby forms the interlocked connection between the first and the second shafts (2, 3).

7. The connecting device (1) according to claim 1, wherein the actuating system (6, 8, 9, 10, 11) comprises a shifting cam (10, 11) arranged on the connecting element (5), and the shifting cam (10, 11) is shaped with a contour which, at least in part, has an axial direction component that when an engagement element (9) of the actuating system (6, 8, 9) engages either on or in the shifting cam (10, 11) and, at the same time the connecting element (5) is rotated relative to the engagement element (9), the connecting element (5) moves to one of the first and the second axial positions (A, B).

8. A connecting device (1) for a rotationally fixed connection of first and second shafts (2, 3) that are rotatable with respect to one another, wherein the connecting device (1) comprises:
 an axially movable connecting element (5) designed such that, in a first axial position (A) thereof, the connecting element forms an interlock between the first and the second shafts (2, 3),
 in a second axial position (B), the connecting element releases the interlock,
 an actuating system (6, 8, 9, 10, 11) for the connecting element between the first and the second axial positions (A, B),
 a stop (16) for limiting axial movement of the connecting element (5) in either the first or the second axial position (A, B),
 an impact damper (17) is arranged axially between the stop (16) and the connecting element (5), and the connecting element (5) comprises a cone (18) orientated in an axial movement direction of the connecting element (5), and the cone (18) co-operates with a distance sensor (19) of the connecting device (1) which is orientated substantially perpendicularly to the axial movement direction such that a distance (x) between the distance sensor (19) and the cone (18), perpendicular to the axial movement direction, can be determined via the distance sensor.

9. The connecting device (1) according to claim 8, wherein an evaluation circuit is provided by which an axial position, of the connecting element (5), is determined from the distance (x) between the distance sensor (19) and the cone (18).

10. A connecting device for connecting first and second shafts of a vehicle drive-train, the connecting device comprising:

an axially movable connecting element being rotationally fixed to and axially movable along the first shaft between a first axial position and a second axial position, in the first axial position of the connecting element, the connecting element couples the first and the second shafts, in a rotationally fixed manner, so as to prevent relative rotation therebetween;

in the second axial position of the connecting element, the first and the second shafts being disconnected and rotatable relative to one another;

an actuating system communicating with the connecting element for axially moving the connecting element between the first and the second axial positions;

a stop being axially fixed on the second shaft for stopping axial movement of the connecting element in the second axial position; and an impact damper being supported on the second shaft axially between the stop and the connecting element, and the impact damper abutting against the stop for reducing an axial impact force of the connecting element against the stop, and the impact damper comprising both a spring element and a damper element.

* * * * *